United States Patent
Morita

(10) Patent No.: US 8,016,088 B2
(45) Date of Patent: Sep. 13, 2011

(54) DAMPING MECHANISM

(75) Inventor: Yuji Morita, Gifu (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 12/801,047

(22) Filed: May 19, 2010

(65) Prior Publication Data
US 2010/0294604 A1 Nov. 25, 2010

(30) Foreign Application Priority Data

May 20, 2009 (JP) .................................. 2009-122030

(51) Int. Cl.
*F16F 9/52* (2006.01)
(52) U.S. Cl. ................. 188/282.6; 188/322.22
(58) Field of Classification Search ............ 188/282.1, 188/282.6, 322.22
See application file for complete search history.

(56) References Cited

U.S. PATENT DOCUMENTS

| | | | |
|---|---|---|---|
| 3,175,645 A * | 3/1965 | Schafer et al. ............ | 188/282.6 |
| 4,615,420 A * | 10/1986 | Mourray ................ | 188/322.15 |
| 4,905,799 A * | 3/1990 | Yamaoka et al. ......... | 188/322.15 |
| 5,085,300 A * | 2/1992 | Kato et al. ................ | 188/282.6 |
| 5,413,195 A * | 5/1995 | Murakami ................ | 188/282.6 |
| 5,529,154 A * | 6/1996 | Tanaka ..................... | 188/282.6 |
| 5,595,269 A * | 1/1997 | Beck ......................... | 188/282.6 |

FOREIGN PATENT DOCUMENTS

JP 2006-194335 A 7/2006

* cited by examiner

*Primary Examiner* — Christopher Schwartz
(74) *Attorney, Agent, or Firm* — Rabin & Berdo, P.C.

(57) ABSTRACT

A damping mechanism (1) that generates a damping force in response to a liquid flow between a first liquid chamber (R1) and a second liquid chamber (R2) comprises a partitioning member (2) separating the first liquid chamber (R1) and the second liquid chamber (R2) and a flow passage (P) formed in the partitioning member (2) to connect the first liquid chamber (R1) and the second liquid chamber (R2). The flow passage (P) comprises an odd number of through-holes (10-14) greater than three which penetrate the partitioning member (2) and are connected in series. A large amount of frictional energy loss due to a long path length occurs in the flow passage (P) and causes the damping mechanism (1) to generate a sufficient damping force.

9 Claims, 4 Drawing Sheets

DAMPING MECHANISM

FIELD OF THE INVENTION

This invention relates to a damping mechanism for a hydraulic shock absorber or the like.

BACKGROUND OF THE INVENTION

JP 2006-194335 A, published by the Japan Patent Office in 2006, proposes a damping mechanism for a hydraulic shock absorber, comprising a leaf valve constituted by plural leaves accumulated on an outlet of a port which is formed through a piston and a supporting member which supports a specific portion of the leaf valve in an axial direction. A central portion of the leaf valve is fixed to the piston and an outer peripheral part of the leaf valve is caused to lift as a pressure in the port increases, thereby opening the port.

When the piston strokes in a direction opposite to the lifting direction of the leaf valve, the outer peripheral part of the leaf valve is lifted from the piston in response to a hydraulic pressure acting on the leaf valve via the port. As the port opens, working fluid flows through the port. The leaf valve generates a damping force on the basis of a flow resistance exerted on the working fluid.

The supporting member causes a specific leaf of the leaf valve to bend in a constant position according to the opening pressure to generate a damping force having preferable characteristics.

SUMMARY OF THE INVENTION

In this damping mechanism, when the piston strokes at a high speed, the damping force is generated by the flow resistance of the leaf valve and an energy loss in the working fluid due to friction when it passes through the port. In contrast, when the piston strokes at a low speed, the energy loss in the port due to friction is small and the damping force is generated in accordance with the flow resistance of the leaf valve.

Accordingly, a number of leaves are required so as to generate a sufficient damping force when the piston stroke speed is low.

As a result, a damping mechanism using a leaf valve is inherently large in size and a manufacturing cost thereof tends to be high.

It is therefore an object of this invention to provide a damping mechanism which can generate a damping force having preferable characteristics while maintaining a simple construction.

To achieve the above object, this invention provides a damping mechanism that generates a damping force in response to a liquid flow formed between a first liquid chamber and a second liquid chamber, comprising a partitioning member separating the first liquid chamber and the second liquid chamber, and a flow passage formed in the partitioning member to connect the first liquid chamber and the second liquid chamber, the flow passage comprising an odd number of through-holes greater than three which penetrate the partitioning member and are connected in series.

It is preferable that the through-holes comprise a first through-hole which penetrates the partitioning member, a second through-hole which penetrates the partitioning member in parallel with the first through-hole, and an intermediate through-hole or an odd number of intermediate through-holes which penetrates the partitioning member in parallel with the first and second through-holes. The damping mechanism further comprises a first communicating groove formed in a surface of the partitioning member facing the first liquid chamber to connect the first through-hole and the intermediate through-hole or one of the intermediate through-holes, a second communicating groove formed in a surface of the partitioning member facing the second liquid chamber to connect the second through-hole and the intermediate through-hole or one of the intermediate through-holes, a first closing member which blocks the communicating groove from communicating with the first liquid chamber, and a second closing member which blocks the second communicating groove from communicating with the second liquid chamber.

The details as well as other features and advantages of this invention are set forth in the remainder of the specification and are shown in the accompanying drawings.

DESCRIPTION OF THE PREFERRED EMBODIMENTS

Figure 1:
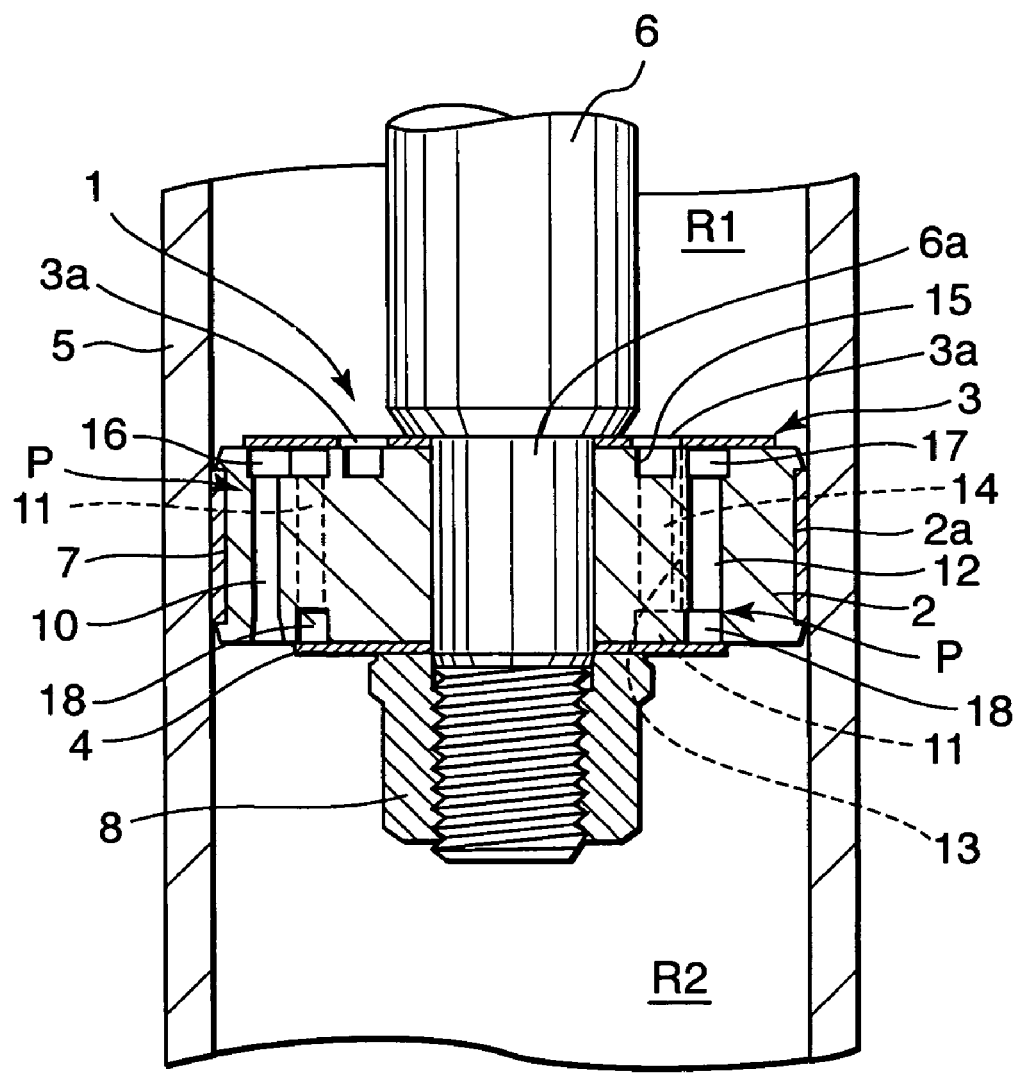
FIG. 1 is a longitudinal sectional view of essential parts of a hydraulic shock absorber comprising a damping mechanism according to an embodiment of this invention.

Referring to FIG. 1 of the drawings, a damping mechanism 1 according to this invention is applied to a piston 2 of a hydraulic shock absorber. The piston 2 is a disk-like member accommodated in a cylinder 5 filled with working fluid so as to be free to slide. A tip of a piston rod 6 is fixed to the piston 2. Another tip of the piston rod 6 projects from the cylinder 5 in an axial direction. The piston 2 separates the cylinder 5 into a first liquid chamber R1 around the piston rod 6 and a second liquid chamber R2 on the opposite side of the piston 2 to the piston rod 6. The piston 2 thus functions as a partitioning member for separating the first liquid chamber R1 from the second liquid chamber R2.

An annular groove 2a is formed in an outer periphery of the piston 2. A piston ring 7 is fitted in the annular groove 2a so as to contact an inner periphery of the cylinder 5. If the piston 2 is formed from a material suited for sliding on the inner periphery of the cylinder 5 such as resin, it is possible to omit the annular groove 2a and the piston ring 7 such that the outer periphery of the piston 2 contacts the inner periphery of the cylinder 5 directly.

The hydraulic shock absorber elongates and contracts according to a load exerted on the piston rod 6 and the cylinder 5 relatively in the axial direction. The piston 2 strokes in the cylinder 5 according to elongation and contraction of the hydraulic shock absorber. The damping mechanism 1 generates a damping force against the elongation and contraction of the hydraulic shock absorber by exerting a flow resistance on working fluid which flows between the first liquid chamber R1 and the second liquid chamber R2 in response to a stroke of the piston 2.

The damping mechanism 1 comprises five flow passages P connecting the first liquid chamber R1 and the second liquid chamber R2, a leaf 3 seated on an end face of the piston 2 facing the first liquid chamber R1, and a second leaf 4 seated on another end face of the piston 2 facing the second liquid chamber R2.

The five flow passages P are located around a center of the piston 2 at equal angular intervals.

Each of the flow passages P comprises a first through-hole 10 and a second through-hole 14 that penetrate the piston 2 in the axial direction, respectively, and three intermediate through-holes 11-13 which penetrate the piston 2 in parallel with the through-holes 10, 14. Each flow passage P is constituted by connecting the five through-holes 10-14 in series using communicating grooves 16-19.

Among the five through-holes 10-14, the first through-hole 10 penetrates the piston 2 in a radially outermost position. The second through-hole 14 penetrates the piston 2 in a radially innermost position. The three intermediate through-holes 11-13 penetrate the piston 2 in positions along a circle located between the first through-hole 10 and the second through-hole 14.

Figure 2:
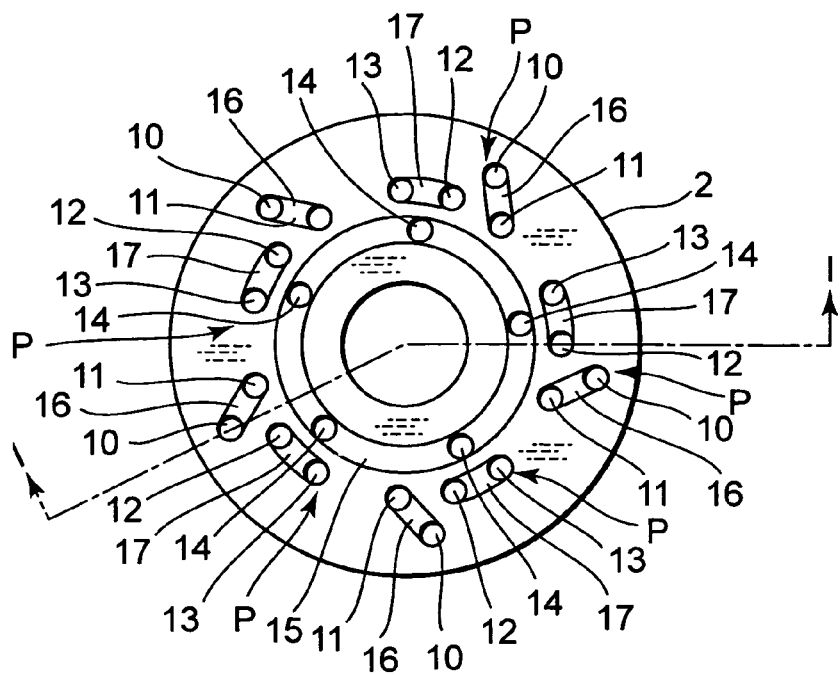
FIG. 2 is a plan view of a piston seen from above according to the embodiment of this invention.

Referring to FIG. 2, a first communicating groove 16 connecting the first through-hole 10 and the intermediate through-hole 11 is formed in the end face of the piston 2 facing the first liquid chamber R1. Further, a communicating groove 17 connecting the intermediate through-holes 12 and 13 is formed in the same end face.

Figure 3:
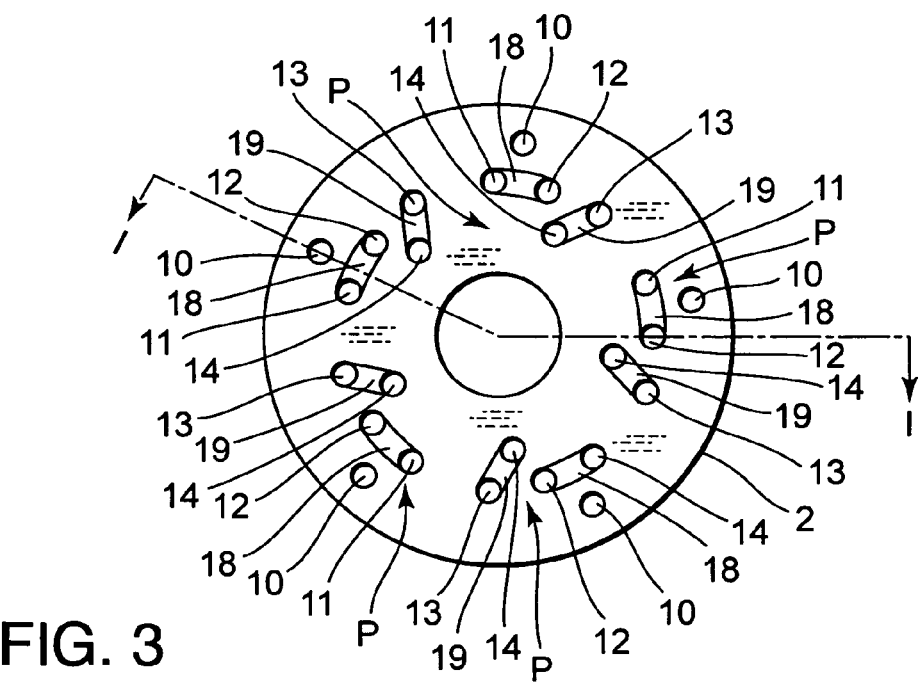
FIG. 3 is a plan view of the piston seen from below.

Referring to FIG. 3, a second communicating groove 19 connecting the second through-hole 14 and the intermediate through-hole 13 is formed in the other end face of the piston 2 facing the second liquid chamber R2. Further, a communicating groove 18 connecting the intermediate through-holes 11 and 12 is formed in the same other end face.

It should be noted that the piston 2 shown in FIG. 1 corresponds to a longitudinal sectional view of the piston 2 taken along a line I-I in FIG. 2 and FIG. 3.

Figure 4:
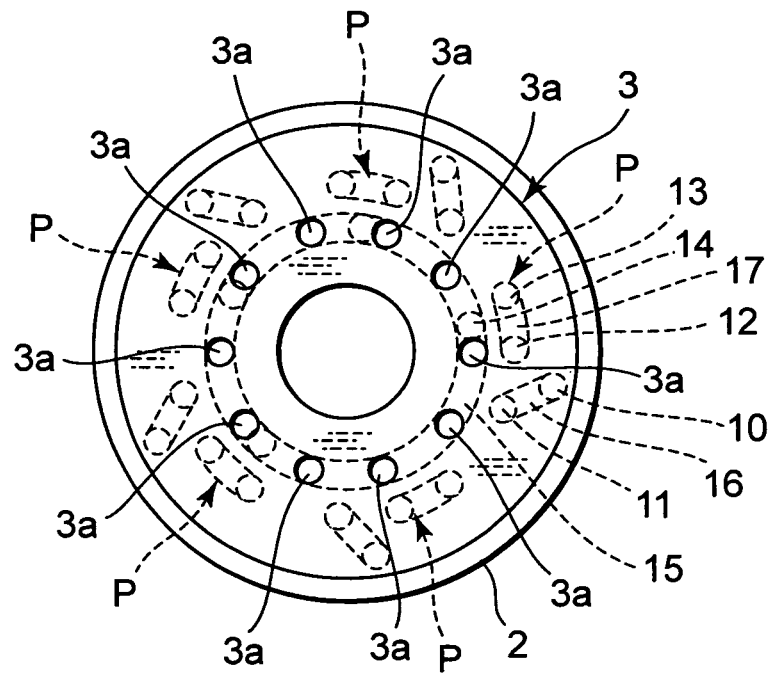
FIG. 4 is a plan view of a leaf seen from a point above the piston according to the embodiment of this invention.

Referring to FIG. 4, the communicating grooves 16 and 17 formed in the end face of the piston 2 facing the first liquid chamber R1 are closed by the leaf 3. The leaf 3 is formed from a circular plate, a central portion of which is fixed to the piston 2. The leaf 3 serves as a first closing member which blocks the communicating grooves 16 and 17 from communicating with the first liquid chamber R1.

Figure 5:
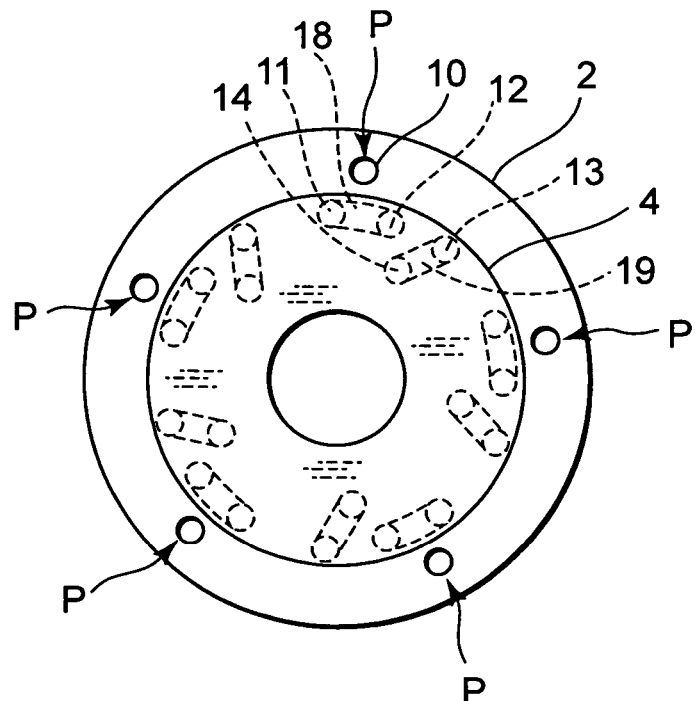
FIG. 5 is a plan view of another leaf seen from a point below the piston according to the embodiment of this invention.

Referring to FIG. 5, the communicating grooves 18 and 19 formed in the other end face of the piston 2 facing the second liquid chamber R2 are closed by the leaf 4. The leaf 4 is formed from a circular plate, a central portion of which is fixed to the piston 2. The leaf 4 serves as a second closing member which blocks the communicating grooves 18 and 19 from communicating with the second liquid chamber R2.

Referring again to FIG. 1, the piston rod 6 comprises a tip portion 6a of a smaller diameter. The tip portion 6a penetrates the leaf 3, the piston 2, and the leaf 4. By securing a nut 8 onto the tip portion 6a penetrating these members, the piston 2 is fixed to the tip of the piston rod 6. At the same time, the central portion of the leaf 3 is gripped by the piston rod 6 and the piston 2 and the central portion of the leaf 4 is gripped by the piston 2 and the nut 8.

A liquid pressure in the flow passage P acts on the leaf 3 via the communicating grooves 16 and 17 as an opening pressure in a lifting direction. The liquid pressure in the flow passage P acts on the leaf 4 via the communicating grooves 18 and 19 as an opening pressure in a lifting direction.

An opening of the first through-hole 10 towards the second liquid chamber R2 is located on the outside of the leaf 4 in the radial direction so as to connect the first through-hole 10 and the second liquid chamber R2 permanently. As a result, the leaf 4 is formed to have a smaller diameter than the leaf 3.

An opening of the second through-hole 14 towards the first liquid chamber R1 is located on an inside of an annular groove 15 which is formed in the end face of the piston 2 facing the first liquid chamber R1. The leaf 3 has ten hole portions 3a for connecting the annular groove 15 and the first liquid chamber R1 permanently. The hole portions 3a are formed at regular angular intervals. The number and a sectional area of the hole portions 3a are set such that a total flow area of the hole portions 3a is greater than a total cross-sectional area of the flow passages P.

According to the construction described above, the second liquid chamber R2 and the first liquid chamber R1 are connected with each other via the five flow passages P, each of which is constituted by the first through-hole 10, the first communicating groove 16, the intermediate through-hole 11, the communicating groove 18, the intermediate through-hole 12, the communicating groove 17, the intermediate through-hole 13, the second communicating groove 19, and the second through-hole 14.

According to the construction described above, the flow passage P is deflected four times in the end faces of the piston 2, and therefore has a sufficient length to causes a large amount of energy loss due to friction in the working fluid flowing there-through. Even when the piston 2 strokes at a low speed, therefore, the damping mechanism 1 generates a sufficient damping force to absorb an oscillation of the shock absorber.

Figure 6:
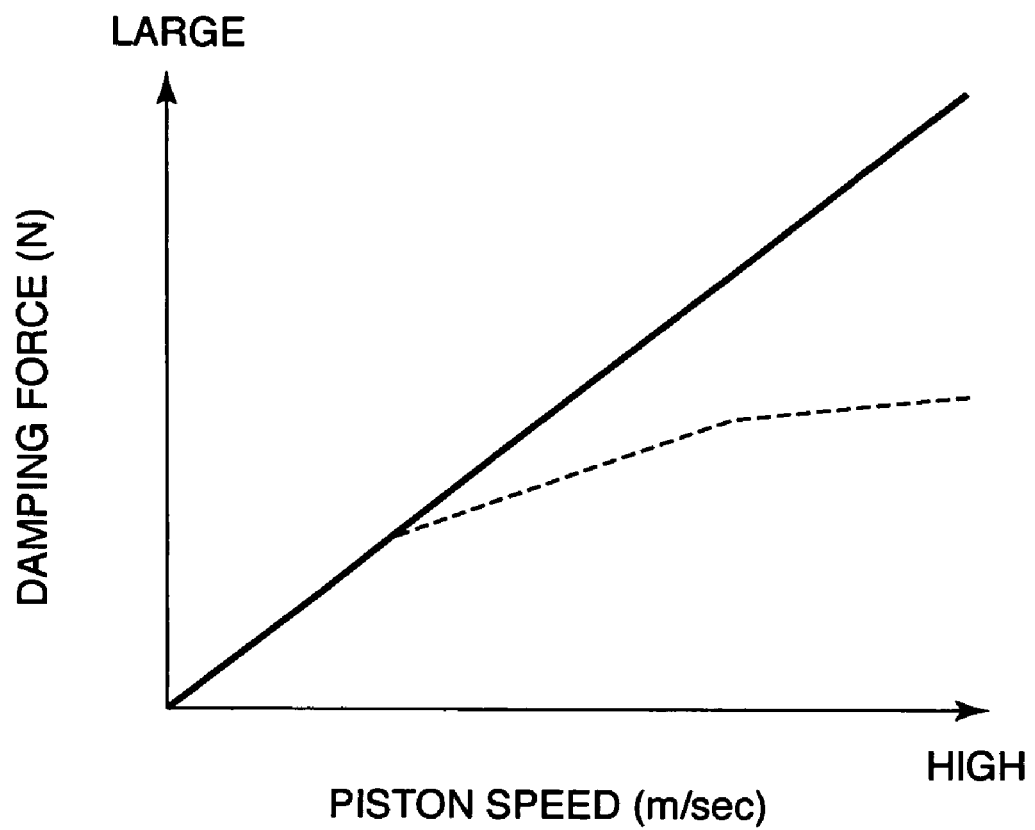
FIG. 6 is a diagram showing damping force characteristics of the hydraulic shock absorber.

Referring to FIG. 6, since the damping force is generated by the frictional resistance in the flow passage P in this damping mechanism 1, the damping force increases in a linear fashion with respect to an increase in the stroke speed of the piston 2 as shown by a solid line in the figure.

According to this damping mechanism 1, therefore, preferable damping force characteristics can be obtained with a simple construction without using a number of accumulated leaves as in the case of the prior-art damping mechanism. As a result, the size of the piston 2 in the axial direction including the damping mechanism 1 can be minimized. A piston having a shorter axial length is preferable in terms of ensuring a longer stroke length of the hydraulic shock absorber with respect to the entire length thereof.

All of the through-holes 10-14 penetrate the piston 2 in the axial direction in parallel with each other. All of the communicating grooves 16-19 are disposed on either end face of the piston 2. The flow passage P can be formed without applying special manufacturing processes to form a through-hole obliquely through the piston 2 and so on. In a case where the piston 2 is formed from a metal material, the piston 2 can be made by casting or sintering such that the through-holes 10-14 and the communicating grooves 16-19 are formed in the piston 2 through a casting or sintering process in advance. When, on the other hand, the piston is formed from a resin, the through-holes 10-14 and the communicating grooves 16-19 can be formed through an injection molding process in advance.

In this damping mechanism 1, a flow path length of the flow passage P can be set arbitrarily by altering the number of the intermediate through-holes. Assuming the total number of the through-holes is an odd number N which is greater than three, the number of the communicating grooves formed on either end face of the piston 2 is defined as (N−1)/2. It is possible to connect the communicating grooves by plural through-holes. In this case, these through-holes are regarded as a group of through-holes and the number of the through-hole groups is counted as N.

By setting the flow path length of the flow passage P in this way, preferable damping force characteristics can be realized.

It is also possible to vary the damping force characteristics of the damping mechanism 1 by changing a flow cross-sectional area of the flow passage P.

According to this embodiment, the leaf 3 serves as the first closing member for blocking the communicating grooves 16 and 17 from communicating with the first liquid chamber R1 and the leaf 4 serves as the second closing member for blocking the communicating groove 18 and 19 from communicating with the second liquid chamber R2. In other words, lifting of the leaves 3 and 4 is not considered when the hydraulic shock absorber elongates and contracts. The flow passage P is therefore the only damping force generation element in the damping mechanism 1. However, it is also preferable to use the leaves 3 and 4 as damping force generation elements along with the flow passage P.

Specifically, the leaf 3 may be configured such that an outer peripheral part of the leaf 3 lifts from the piston 2 to allow working fluid to flow from the second liquid chamber R2 to the first liquid chamber R1 directly via the first through-hole 10, when the pressure in the second liquid chamber R2 exceeds the pressure in the first liquid chamber R1 by a predetermined value or greater. The leaf 4 may be such configured that an outer peripheral part of the leaf 4 lifts from the piston 2 to allow working fluid to flow from the first liquid chamber R1 to the second liquid chamber R2 directly via the second through-hole 14 when the pressure in the first liquid chamber R2 exceeds the pressure in the second liquid chamber R1 by a predetermined value or greater.

In this damping mechanism 1, the communicating groove 16 is located further outward than the communicating groove 17 in the radial direction. When the outer peripheral part of the leaf 3 lifts from the piston 2, the communicating groove 16 located further outward than the communicating groove 17 in the radial direction opens onto the first liquid chamber R1 first such that the first through-hole 10 communicates with the first liquid chamber R1. Thereafter, when the outer peripheral part of the leaf 3 lifts further, the communicating groove 17 opens onto the first liquid chamber R1 such that the intermediate through-hole 12 communicates with the first liquid chamber R1. In this case, therefore, a damping coefficient during contraction of the hydraulic shock absorber decreases in two steps, as shown by a broken line in FIG. 6.

With respect to elongation of the hydraulic shock absorber, since the leaf 4 lifts to cause the communicating grooves 18 and 19 to communicate with the second liquid chamber R2 simultaneously, the elongation damping coefficient decreases in one step.

When the leaves 3 and 4 are used as damping force generation elements, therefore, the damping force characteristics of the damping mechanism 1 can be varied widely in various fashions by changing the locations of the communicating groove 16-19 and a rigidity of the leaves 3, 4 against bending or an initial bending amount thereof.

In a hydraulic shock absorber disposed between a vehicle body and a wheel axis of a vehicle, it is generally required that the shock absorber generates a greater damping force when it elongates than when it contracts. In this damping mechanism 1, among the through-holes 10-14, the first through-holes 10 are disposed in the outermost position of the piston 2 while the second through-holes 14 are disposed in the innermost position of the same.

The leaf 3 that closes the communicating grooves 16 in which the first through-holes 10 have openings is made to have a greater diameter than the leaf 4. In order to make the damping force generated during elongation of the shock absorber greater than the damping force generated during contraction of the shock absorber, the rigidity of the leaf 4 against bending must be higher than the rigidity of the leaf 3 against bending since the leaf 4 lifts when the shock absorber elongates and the leaf 3 lifts when it contracts.

According to this damping mechanism 1, since the leaf 4 has a smaller diameter than the leaf 3, the required relation between the rigidity of the leaf 3 against bending and that of the leaf 4 can be satisfied using an identical material. Accordingly, this damping mechanism 1 brings about preferable characteristics when applied to a vehicle hydraulic shock absorber.

The contents of Tokugan 2009-122030, with a filing date of May 20, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the embodiment described above, the damping mechanism 1 is installed in the piston 2 of a hydraulic shock absorber. This damping mechanism 1 may however be applied to a so-called base valve that is provided in a bottom of the cylinder 5 of the hydraulic shock absorber so as to generate a damping force by exerting a flow resistance on a liquid flow between the second liquid chamber R2 and a reservoir provided on the outside of the cylinder.

More generally, the damping mechanism according to this invention can be applied to any damping mechanism that generates a damping force in response to a flow of working fluid between two liquid chambers partitioned by a partitioning member such as a piston and a cylinder bottom.

Further, when the leaves 3 and 4 are not used as damping force generation elements, or in other words when lift of the leaves 3 and 4 is not required, the leaves 3 and 4 may be fixed directly to the piston 2 instead of gripping the central portion thereof by the piston rod 6 and the piston 2 or by the nut 8 and the piston 2. The first closing member which blocks the communicating grooves 16 and 17 from communicating with the first liquid chamber R1 may be constituted by members of various shapes different from the leaf 3, which is constituted by a plate material. The second closing member which blocks the communicating grooves 18 and 19 from communicating with the second liquid chamber R2 may be constituted by members of various shapes different from the leaf 4, which is constituted by a plate material.

The embodiments of this invention in which an exclusive property or privilege is claimed are defined as follows:

What is claimed is:

1. A damping mechanism that generates a damping force in response to a liquid flow formed between a first liquid chamber and second liquid chamber, comprising:
    a partitioning member separating the first liquid chamber and the second liquid chamber; and
    a flow passage formed in the partitioning member to connect the first liquid chamber and the second liquid chamber, the flow passage comprising an odd number of through-holes greater than three which penetrate the partitioning member and are connected in series,
    wherein the through-holes comprise:
    a first through-hole which penetrates the partitioning member;
    a second through-hole which penetrates the partitioning member in parallel with the first through-hole; and
    an intermediate through-hole or an odd number of intermediate through-holes which penetrates the partitioning member in parallel with the first and second through-holes,
    wherein the damping mechanism further comprises:

a first communicating groove formed in a surface of the partitioning member facing the first liquid chamber to connect the first through-hole and the intermediate through-hole or one of the intermediate through-holes;

a second communicating groove formed in a surface of the partitioning member facing the second liquid chamber to connect the second through-hole and the intermediate through-hole or one of the intermediate through-holes;

a first closing member which blocks the communicating groove from communicating with the first liquid chamber; and a second closing member which blocks the second communicating groove from communicating with the second liquid chamber.

2. The damping mechanism as defined in claim 1, comprising a plurality of flow passages, each of which comprises the first through-hole, the first communicating groove, the intermediate through-hole or the intermediate through-holes, the second communicating groove, and the second through-hole, to connect the first liquid chamber and the second liquid chamber.

3. The damping mechanism as defined in claim 2, wherein the partitioning member has an annular groove facing the first liquid chamber to connect the second through-holes, and the first closing member has a hole portion connecting the annular groove and the first liquid chamber.

4. The damping mechanism as defined in claim 2, wherein the partitioning member has a circular cross-sectional shape having a center, the second through-holes are located closer to the center of the partitioning member than the first through-hole, the second closing member is formed in a circular shape coaxial with the partitioning member and having an outer periphery, and the first through-holes have openings to the second liquid chamber on an outside of the outer periphery of the second closing member.

5. The damping mechanism as defined in claim 1, wherein the number of the intermediate through-holes is an odd number greater than three, the damping mechanism further comprises a first intermediate communicating groove or first intermediate communicating grooves formed in the partitioning member facing the first liquid chamber to connect two of the intermediate through-holes. the first intermediate communicating groove or the first intermediate communicating grooves being blocked by the first closing member from communicating with the first liquid chamber, and a second intermediate communicating groove or second intermediate communicating grooves formed in the partitioning member facing the second liquid chamber to connect two of the intermediate through-holes, the second intermediate communicating groove or the second intermediate communicating grooves being blocked by the second closing member from communicating with the second liquid chamber, and the intermediate through-holes are connected in series via the first and second intermediate communicating grooves.

6. The damping mechanism as defined in claim 5, wherein the total number of the first communicating groove, the second communicating groove, and the intermediate communicating groove or the intermediate communicating grooves is defined as $(N-1)/2$, where the total number of the first through-hole, the second through-hole, and the intermediate through-holes is N.

7. The damping mechanism as defined in claim 1, wherein the first closing member comprises a leaf valve which allows the communicating groove or the communicating grooves facing the first liquid chamber to communicate with the first liquid chamber as a pressure in the second liquid chamber increases with respect to a pressure in the first liquid chamber.

8. The damping mechanism as defined in claim 1, wherein the second closing member comprises a leaf valve which allows the communicating groove or the communicating grooves facing the second liquid chamber to communicate with the second liquid chamber as a pressure in the first liquid chamber increases with respect to a pressure in the second liquid chamber.

9. The damping mechanism as defined in claim 1, wherein the partitioning member comprises a piston accommodated in a cylinder of a hydraulic shock absorber so as to slide within the cylinder in a direction of a cylinder axis, and all of the through-holes are formed in the partitioning member in parallel with the cylinder axis.

* * * * *